(No Model.)
W. H. WILKINSON.
MICROMETER CALIPERS.
No. 350,516. Patented Oct. 12, 1886.
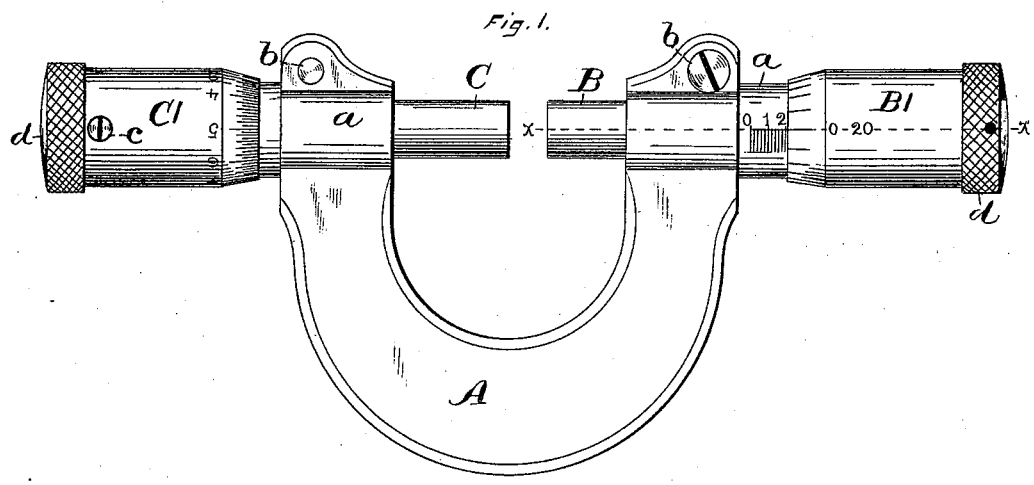
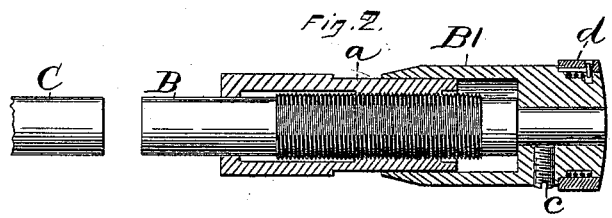
Witnesses.
John Edwards Jr.
C. A. Shepard.
Inventor.
William H. Wilkinson.
By James Shepard. Atty.

UNITED STATES PATENT OFFICE.

WILLIAM H. WILKINSON, OF BOSTON, MASSACHUSETTS.

MICROMETER-CALIPERS.

SPECIFICATION forming part of Letters Patent No. 350,516, dated October 12, 1886.

Application filed January 21, 1886. Serial No. 189,278. (No model.)

*To all whom it may concern:*

Be it known that I, WILLIAM H. WILKINSON, a citizen of the United States, residing at Boston, in the county of Suffolk and State of Massachusetts, have invented certain new and useful Improvements in Micrometer-Calipers, of which the following is a specification.

My invention relates to that class of micrometer-calipers in which a measuring-screw acts in opposition to an abutment or anvil; and the main object of my improvement is to produce micrometer-calipers that will register a measurement in either one of two systems or scales that the operator may desire.

In the accompanying drawings, Figure 1 is a side elevation of my calipers; and Fig. 2 is a sectional view, partly in elevation, of one end of the same on line $x$ $x$ of Fig. 1, together with an elevation of the confronting end of the opposite screw. Both figures are on an enlarged scale.

A designates the frame, having a split nut, $a$, at each end, and a clamp-screw, $b$, for springing the nut together when desired. Within these nuts I place the measuring-screws B C. The nuts are so long that the inner ends of the screw are not threaded, but are left plain for some distance, whereby the threaded portion of the screws are never exposed; but thus protecting the thread of the serew is not of my invention. Other known forms of screws in micrometer-calipers may be substituted for this covered screw without departing from my invention. To the outer ends of the screws B C, I secure the sleeves B' C', so that they rotate with the screw. The cylindrical portion of each nut $a$ is provided on one side with a straight line for an index and a scale, whose graduations correspond with the thread of the screw, as shown at the right-hand side of Fig. 1. The screw B has fifty threads to the inch, while the sleeve B' is divided into twenty parts. Thus, if the screw be turned one revolution it has receded one-fiftieth of an inch, which is equal to twenty one-thousandths. Each of the twenty divisions on the sleeve must then be one one-thousandth. The screw C is so threaded that each thread occupies a space on the length of the screw equal to one millimeter, and consequently one revolution of the screw will cause it to recede one millimeter. The sleeve C' is divided into one hundred parts, and therefore registers one one-hundredth of a millimeter, or one one-thousandth of a centimeter for each division of the sleeve. Both of the screws are so made and adjusted that when their inner ends are brought closely together at the middle point of the frame they will register zero. In order to measure with either screw, the screw opposite the one whose scale or system is to be used is set at zero, so that its inner end may serve as the anvil for the opposing screw. The latter screw is then used in the ordinary manner. When the calipers are to be used repeatedly for registering only one system or scale, the screw which is set at zero to serve as the anvil may be firmly locked against accidental displacement by tightening the clamp-screw $b$. This clamp-screw is, as in other calipers, used to take up the wear of the thread of the adjusting-screw and its nut.

It is evident that there should be some means for compensating for wear at the inner ends of the screws. This I accomplish by setting one screw at zero, and then, if the other screw does not register zero when it is screwed home, I loosen the set-screw $c$ of the sleeve; then turn the sleeve on the smooth outer end of the measuring-screw until the sleeve registers zero. The set-screw $c$ is then tightened to hold the sleeve in proper position on its measuring-screw, and the instrument will then measure correctly. This adjustment, when separately considered, is not of my invention, and is herein described only to show one way by which my duplex micrometer may be adjusted to compensate for wear.

While I have shown my instrument for registering the metric system on one side and thousandths of an inch upon the other, I do not wish to confine myself to these two particular systems or scales, as any desired systems or scales may be employed—as, for instance, a screw and scale for registering in sixteenths, thirty-seconds, &c., of an inch may be substituted for either of those hereinbefore described.

The knurled head $d$, by which to turn the screws, is a device to prevent undue pressure, and is not of my invention. This feature and the manner of adjusting the screw to compensate for wear at its head will be made the subject of another application of even date herewith by another inventor and assigned to me.

I claim as my invention—

The duplex micrometer herein described, consisting, essentially, of a frame, two measuring systems or scales, and two opposing measuring-screws, the inner ends of which screws are each adapted, when set at zero, to serve, respectively, as the anvil for the opposite screw, substantially as described, and for the purpose specified.

WILLIAM H. WILKINSON.

Witnesses:
SAML. JENNISON,
WALDO D. PUTNAM.